US011311815B1

(12) United States Patent
Trindle

(10) Patent No.: US 11,311,815 B1
(45) Date of Patent: Apr. 26, 2022

(54) SUSPENSION SHOCK ABSORBER

(71) Applicant: Earl Ray Trindle, Cypress, TX (US)

(72) Inventor: Earl Ray Trindle, Cypress, TX (US)

( * ) Notice: Subject to any disclaimer, the term of this patent is extended or adjusted under 35 U.S.C. 154(b) by 0 days.

(21) Appl. No.: 17/381,387

(22) Filed: Jul. 21, 2021

Related U.S. Application Data

(60) Provisional application No. 63/105,221, filed on Oct. 24, 2020.

(51) Int. Cl.
*B60G 17/08* (2006.01)
*A63H 17/26* (2006.01)
*B60G 13/06* (2006.01)
*B60G 15/06* (2006.01)
*A63H 30/04* (2006.01)

(52) U.S. Cl.
CPC ........... *A63H 17/262* (2013.01); *B60G 13/06* (2013.01); *B60G 15/06* (2013.01); *B60G 17/08* (2013.01); *A63H 30/04* (2013.01); *B60G 2202/24* (2013.01); *B60G 2204/62* (2013.01); *B60G 2206/41* (2013.01); *B60G 2206/7105* (2013.01); *B60G 2300/20* (2013.01); *B60G 2500/104* (2013.01); *B60G 2600/20* (2013.01); *B60G 2600/21* (2013.01); *B60G 2800/162* (2013.01)

(58) Field of Classification Search
CPC .... B60G 15/06; B60G 17/08; B60G 2202/24; B60G 2206/41; B60G 2600/20; B60G 2800/162; A63H 17/262
See application file for complete search history.

(56) References Cited

U.S. PATENT DOCUMENTS

| 3,420,341 | A | * | 1/1969 | Keehn | ................... | B60G 17/08 |
| | | | | | | 188/319.1 |
| 3,537,715 | A | * | 11/1970 | Gualdoni | ................. | F16F 9/50 |
| | | | | | | 280/124.104 |
| 3,884,602 | A | * | 5/1975 | Phillips | ................... | F01C 19/12 |
| | | | | | | 418/142 |
| 4,123,068 | A | * | 10/1978 | Van Gorder | ............ | F16H 57/08 |
| | | | | | | 277/436 |
| 5,172,794 | A | * | 12/1992 | Ward | ...................... | F16F 9/092 |
| | | | | | | 188/282.8 |
| 7,270,222 | B1 | | 9/2007 | Aymar | | |
| 7,607,522 | B2 | | 10/2009 | Nygren et al. | | |
| 9,079,471 | B1 | | 7/2015 | Arends | | |
| 9,333,829 | B2 | | 5/2016 | King et al. | | |
| 10,697,514 | B2 | | 6/2020 | Marking | | |
| 2002/0121416 | A1 | * | 9/2002 | Katayama | ............... | F16F 9/064 |
| | | | | | | 188/314 |

(Continued)

*Primary Examiner* — Frank B Vanaman
(74) *Attorney, Agent, or Firm* — Wooshik Shim; Bold IP, PLLC

(57) ABSTRACT

A suspension shock absorber for remote control (RC) cars includes an inner tube and an outer tube coaxial with each other. The hollow area inside the inner tube defines a hollow chamber where a piston and a piston rod slidably moves. A shock cap seals the top of the inner tube and the outer tube. The space between the coaxial inner tube and outer tube is used as an inter-tube bypass route through which bypass oil flows. The shock cap has a bypass passage connecting the inter-tube bypass route with the upper portion of the hollow chamber. A bypass valve in line with the co-axis of the inner tube and the outer tube is disposed on top of the shock cap and used to regulate the amount of oil flow through the bypass passage.

15 Claims, 9 Drawing Sheets

(56) References Cited

U.S. PATENT DOCUMENTS

2009/0107783 A1* 4/2009 Ota ................. B60G 13/08
                                                 188/313
2011/0083929 A1* 4/2011 Marking ............ F16F 9/53
                                                188/267.2

* cited by examiner

SUSPENSION SHOCK ABSORBER

CROSS-REFERENCE TO RELATED APPLICATION

This application claims the benefit of U.S. Provisional Application No. 63/105,221 filed Oct. 24, 2020.

TECHNICAL FIELD

The present description relates generally to a suspension shock absorber. More specifically, the present description relates to a suspension shock absorber having a twin-tube design with an in-line screw-actuated bypass valve and a rebound volume spacer.

BACKGROUND

Vehicles such as automobiles, bicycles, and motorcycles typically include one or more shock absorbing system. The basic mechanism of oil-based shock absorbers is providing a relatively large cylinder chamber filled with oil in which a piston moves back and forth, and a resistive path through which oil flows when the piston compresses or decompresses the oil in the cylinder chamber, thereby generating friction.

A simple type of oil-based shock absorber has a cylinder filled with oil and a piston moving within the cylinder, where the piston has a number of small holes through it. When the piston moves in one or the other direction in the cylinder during the compression or rebounding, the oil flows through the holes, generating friction or resisting force against the piston's movement. The size of the holes and the viscosity of the oil determine the amount of resistance, which then determines the hardness or softness of the shock absorber. Often the rebounding motion of the piston is assisted by an external spring that pushes the piston.

Another type of oil-based shock absorber is called a bypass shock absorber. Bypass shock absorbers have a cylinder filled with oil and a piston moving within the cylinder, and on the cylinder wall there are small bypass holes connected to a narrow external passage. The external passage connects the upper side of the cylinder and the lower side of the cylinder through the bypass holes. When the piston moves up and compresses oil in the upper side of the cylinder, some of the compressed oil may flow through a bypass hole and the external passage back to the lower, decompressed side of the cylinder, thereby dampening the shock from compression. When the piston moves beyond the position of the bypass hole on the upper side of the cylinder, the flow through the external passage stops, thereby hardening the compression. For this reason, bypass shock absorbers are position-sensitive shock absorbers, where compression is dampened initially but hardened beyond a certain point, and vice versa when rebounding. The position-sensitiveness can be controlled by the positions of the bypass holes on the cylinder wall.

In both types of oil-based shock absorbers, when the ambient temperature changes, the viscosity and volume of the oil change. As a result, the degree and rate of shock absorption change according to the ambient temperature.

Shock absorbers applied to remote control (RC) cars are very sensitive to ambient temperature. Because RC cars are lightweight and small in size compared to regular cars and other vehicles, RC cars are more affected by small variations in terrain profile. Especially when it comes to RC car racing where cars run at high speed, small differences in response to shocks make a large difference. For this reason, RC car users frequently check shock absorbers even in the middle of races to adjust to the temperature and the road condition. To enhance or reduce the damping speed of shock absorbers, RC car users conventionally change oils having different properties such as viscosity and expansion coefficient. However, this is cumbersome and time-consuming when adjustments must be done quickly because shock absorbers must be taken out of the car for adjustments.

Another issue with conventional oil-based shock absorbers is air cavitation. For a very fast compression, sometimes oil bypass flow cannot keep up with the speed of compression. In response to this, some shock absorbers have "bladders" on the upper side of the cylinder. A bladder is a block of rubber tube where the inside is filled with air or other gas. Because gas is more prone to compression and expansion, a bladder can quickly absorb fast compression. However, while the piston is moving fast during fast compression, the decompressed oil in the lower side of the cylinder is aerated due to sudden expansion. The air bubbles trapped in oil affects the speed of compression and decompression over time, which in turn affects the performance of RC cars. For the reasons mentioned above, there is a need for improving oil-based shock absorbers.

SUMMARY

The disclosure presented herein relates to a suspension shock absorber, and more specifically, a suspension shock absorber for remote control (RC) cars. The shock absorber includes an inner tube and an outer tube coaxial with each other. The hollow area inside the inner tube defines a hollow chamber where a piston and a piston rod slidably moves. A shock cap seals the top of the inner tube and the outer tube. The space between the coaxial inner tube and outer tube is used as an inter-tube bypass route through which bypass oil flows. The shock cap has a bypass passage connecting the inter-tube bypass route with the upper portion of the hollow chamber. A bypass valve in line with the co-axis of the inner tube and the outer tube is disposed on top of the shock cap and used to regulate the amount of oil flow through the bypass passage.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

In the Summary above, this Detailed Description, the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range having a lower limit and an upper limit corresponding to the first number and the second number, respectively. For example, 25 to 100 mm means a range whose lower limit is 25 mm and upper limit is 100 mm.

The present disclosure relates to a suspension shock absorber. More specifically, the present disclosure relates to a suspension shock absorber having a twin-tube design with an in-line screw-actuated bypass valve and a rebound volume spacer.

Figure 1:
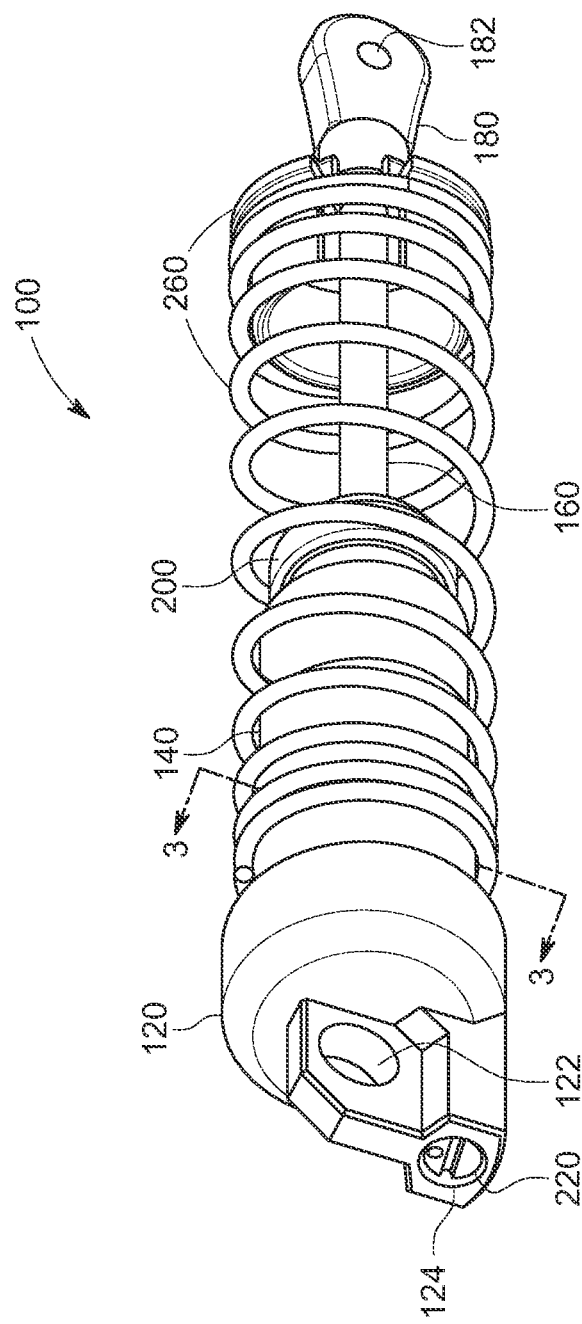
FIG. 1 is a perspective view depicting a suspension shock absorber according to one embodiment of the present invention.

FIG. 1 is a perspective view depicting one embodiment of a suspension shock absorber, designated as a suspension shock absorber 100. The suspension shock absorber 100 includes a shock cap 120, an outer tube body 140, a piston rod 160, a shock end 180, and a shock dust cap 200. The shock cap 120 has a top eyelet 122 which bolts to a frame of the particular vehicle using the suspension shock absorber 100. The shock cap 120 also has a screw hole 124 which receives a bypass valve 220 where the depth of the bypass valve 220 into the shock cap 120 is adjustable by turning bypass valve 220 with a screw driver (not shown). The shock end 180 has a bottom eyelet 182 which bolts to an axle or wheel of the particular vehicle using the suspension shock absorber 100.

Figure 2:
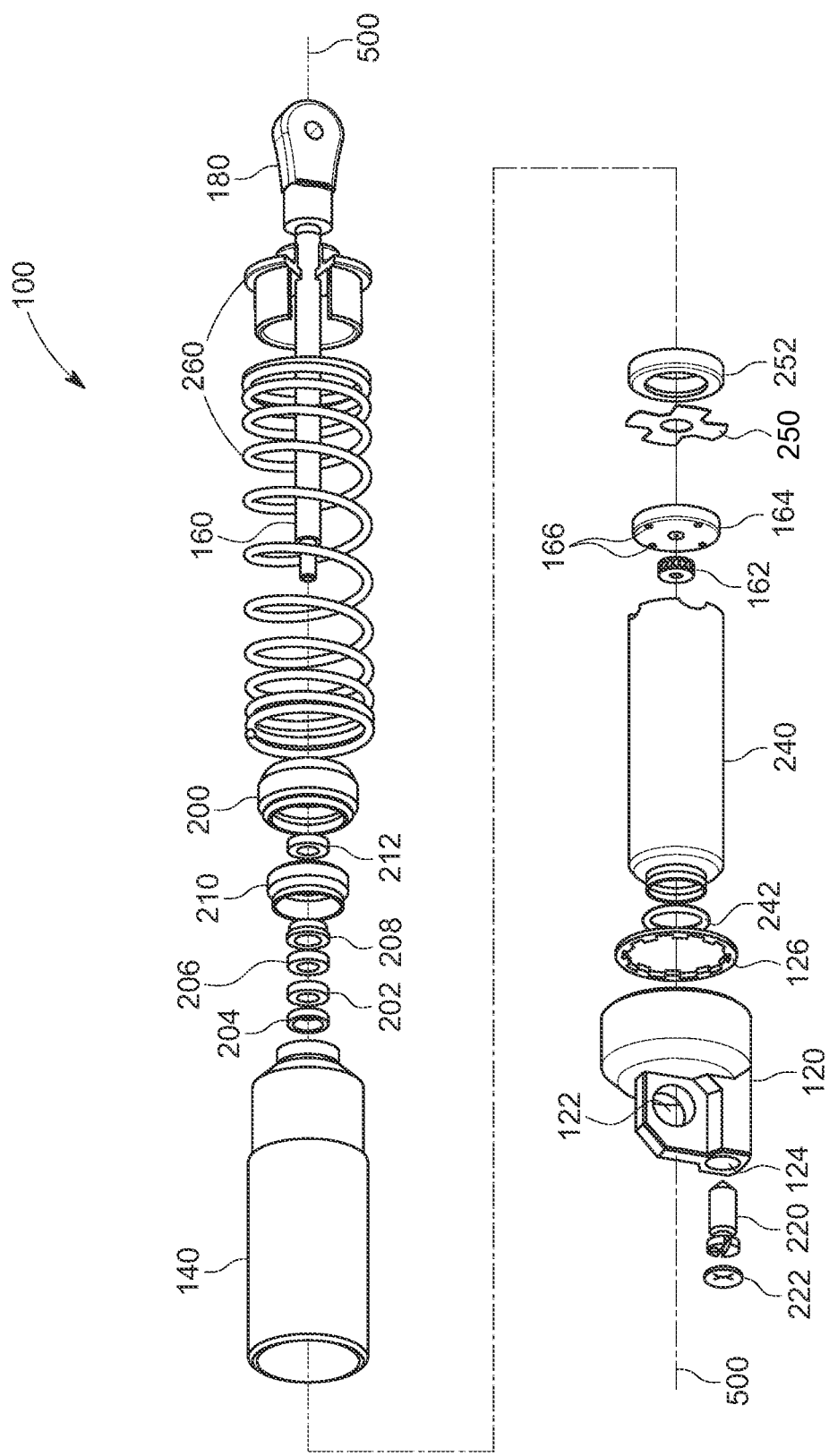
FIG. 2 an exploded perspective view depicting the suspension shock absorber of FIG. 1 along a central axis.

FIG. 2 is an exploded perspective view of the suspension shock absorber 100 exploded along a central axis 500. The shock absorber 100 further includes a bypass valve O-ring 222, a shock cap oil-ring 126, an inner tube body 240, an inner tube O-ring 242, a piston retainer/nut 162, a piston 164, a volume spacer retainer 250, a volume spacer 252, a shock shaft O-ring 202, a shock shaft bushing 204, an upper shock shaft O-ring 206, a shock shaft shield 208, a bottom shock cap 210, and a lower shock shaft O-ring 212.

Figure 3:
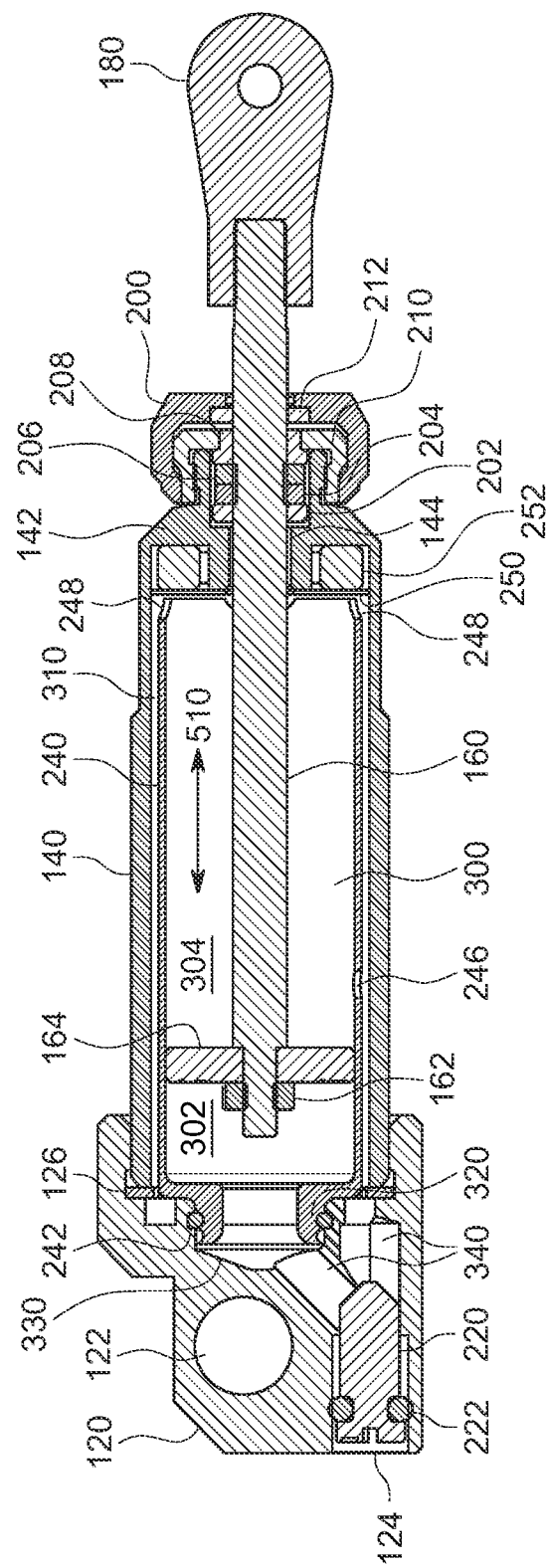
FIG. 3 is a sectional view of the suspension shock absorber of FIG. 1 taken at the sectioning plane and in the direction indicated by section lines 3-3.

When assembled, the bypass valve O-ring 222 is inserted into a bypass valve O-ring groove as shown in FIG. 3 around a perimeter of the bypass valve 220, and the inner tube O-ring 242 is inserted into an inner tube O-ring groove as shown in FIG. 3 around a perimeter of the inner tube body 240. The relative positions and functions of other parts will be explained in further detail later. Note that the parts shown in FIG. 2 are not a complete list of the parts included in the shock absorber 100, and additional parts and/or a variation of the parts may be included. For example, a shock spring adjuster O-ring (not shown) and a shock spring adjuster/nut (not shown) may be disposed next to the shock dust cap 200 away from the outer tube body 140. The shock spring adjuster O-ring and a shock spring adjuster/nut may be used to adjust the strength of an external spring 260 that helps the rebounding action of the shock absorber 100.

FIG. 3 is a sectional view of the suspension shock absorber 100 taken at the sectioning plane and in the direction indicated by section lines 3-3. A portion of the screw hole 124 in the shock cap 120 has female screw threads (not shown) on its inner surface. Bypass valve 220 has male screw threads (not shown) around its outer surface that mate with the female screw threads of the screw hole 124 of the shock cap 120, such that the bypass valve 220 is screwed into the screw hole 124. The outer diameter of the bypass valve O-ring 222 snuggly fits the inner diameter of the screw hole 124 of the shock cap 120 such that the bypass valve O-ring 222 seals the shock cap 120 and prevents oil from leaking through the screw hole 124.

The inner tube body 240 has a hollow cylindrical chamber 300 which allows the piston 164 to move back and forth along the central axis 500 (shown in FIG. 2) as illustrated by an arrow 510. The piston 164 divides the hollow cylindrical chamber 300 into two subspaces, defining an upper chamber 302 and a lower chamber 304 as shown in FIG. 3. The inner diameter of the inner tube body 240 is only slightly larger than the diameter of the piston 164 such that when the piston 164 moves, little oil may be leaked from one side to the other side of the cylindrical chamber 300 while providing sufficient lubrication between the inner tube body 240 and the piston 164. Such a diameter gap or tolerance may be well known to a person having ordinary skill in the art relevant to manufacturing pistons. Because of this tight sealing by the piston 164 inside the inner tube body 240, when the piston 164 moves, there is friction against the direction of its motion. Although the inner tube body 240 has a hollow cylindrical chamber 300 and the piston 164 has a shape of a circular disk in the figures, the inner tube body 240 may have any other cross-sectional shape. For example, the inner tube body 240 may have a hollow chamber shaped like a rectangular prism having a rectangular cross-section, and the piston 164 may be a disk having a corresponding rectangular cross-section.

The outer diameter of the inner tube body 240 is smaller than the inner diameter of the outer tube body 140. The space between the outer tube body 140 and the inner tube body 240 defines an inter-tube bypass route 310. The volume of the inter-tube bypass route 310 is relatively smaller than the volume of the cylindrical chamber 300. The relative ratio between these two volumes is a controllable factor at the time of manufacturing such that the relative amount of oil flow bypassed through the inter-tube bypass route 310 may be controllable, thereby controlling the compression and rebound speeds.

The inner tube body 240 is inserted to the shock cap 120 and forms an oil-tight contact with each other to prevent oil from leaking. As shown in FIG. 3, in some embodiments the shock cap 120 has a shock cap receptacle 330 which is a recess receiving an inner tube neck 320 of the inner tube body 240. As shown in FIG. 3, in some embodiments the shape of the shock cap receptacle 330 is a hollow cylinder, and the shape of the inner tube neck 320 is substantially cylindrical with an outer diameter smaller than the inner diameter of the shock cap receptacle 330. The oil-tight contact is provided by the inner tube O-ring 242 disposed around the inner tube neck 320. In other embodiments, the shock cap receptacle 330 may have other shapes than a hollow cylinder with its matching shape for the inner tube neck 320 so long as oil-tight contact is secured. In some embodiments, more than one inner tube O-rings may be used to seal the connection between the shock cap 120 and the inner tube body 240. Alternatively, any other method of oil-tight contact known to a person having ordinary skill in the art may be used between the shock cap 120 and the inner tube body 240.

The shock cap 120 also includes a shock cap bypass passage 340 in fluid communication with the hollow cylindrical chamber 300 and the inter-tube bypass route 310 through the inner tube neck 320 and the shock cap receptacle 330. The shock cap bypass passage 340 may be partially or fully blocked by the bypass valve 220 when the bypass valve 220 is screwed down, as explained in detail below.

The outer tube body 140 is inserted to the shock cap 120 and forms an oil-tight contact with each other to prevent oil from leaking. When the shock absorber 100 is assembled, a shock cap oil ring 126 disposed between the shock cap 120 and the outer tube body 140 is pressed between them and helps oil from leaking. Tightening between the shock cap 120 and the outer tube body 140 may be made or assisted by a matching pair of threads on the inner perimeter of the shock cap 120 and the outer perimeter of the outer tube body 140 such that the outer tube body 140 may be screwed into the shock cap 120. However, any other method known to a person having ordinary skill in the art may be used to secure an oil-tight contact between the shock cap 120 and the outer tube body 140.

Due to the repetitive tightening and unscrewing of the shock cap 120 and the outer tube body 140, it was found that the shock cap oil ring 126 pressed between them may be subject to deformation. Such deformation may create an uneven gap between the shock cap 120 and the outer tube body 140 and cause restriction in the flow through the inter-tube bypass route 310. As shown in FIG. 2, in order to reduce deformation, the shock cap oil ring 126 has a structure comprising grooves and ridges around its inner perimeter. Although the shock cap oil ring 126 of FIG. 2 has rectangular shaped grooves and ridges, other shapes of grooves and ridges may be used.

In some embodiments, as shown in FIG. 3, on the side of the inner tube body 240, one or more position-sensitive bypass port 246 may be located at a certain distance from the bottom floor 142 of the inner tube body 240. The position-sensitive bypass port 246 is a hollow area on the side of the inner tube body 240 allowing for fluid communication between the inter-tube bypass route 310 and the shock cap bypass passage 340. On one end of the inner tube body 240 near a bottom floor 142 of the outer tube body 140, there is one or more bottom bypass port 248 allowing for fluid communication between the inter-tube bypass route 310 and the shock cap bypass passage 340. The bottom bypass port 248 may be a cutout from the wall of the inner tube body 240 as shown in FIGS. 2-3. Alternatively, the bottom bypass port 248 may be a through hole near the end of the inner tube body 240. Other configurations known to a person having ordinary skill in the art that allow for fluid communication between the inter-tube bypass route 310 and the shock cap bypass passage 340 may be possible.

As shown in FIG. 3, the volume spacer retainer 250 and the volume spacer 252 sit at the bottom end of the outer tube body 140. The volume spacer 252 has a characteristic like foam that is subject to deformation when directly or indirectly compressed mediated by the oil pressure by the piston 164 against the bottom floor 142 of the outer tube body 140. The volume spacer 252 may be made of elastomeric material including, but not limited to, sponge made out of polyester, polyurethane, melamine, silicone, wood fiber and/or cellulose, neoprene, and rubber. In some embodiments, as shown in FIG. 3, the volume spacer retainer 250 may be shaped like a thin sheet having a thickness of about 1 mm, for example, and it is made of rigid material including, but not limited to, plastic and metal.

The outer tube body 140 has a through hole 144 through the bottom floor 142 through which the piston rod 160 is disposed. The piston rod 160 runs from the hollow cylindrical chamber 300 defined by the inner tube body 240 through the through hole 144 and is connected to shock end 180. Piston 164 is securely fastened on the piston rod 160 at the opposite end from the shock end 180 by the piston retainer/nut 162. The piston rod 160, piston retainer/nut 162, and piston 164 may be made out of material that provides sufficient rigidity for the piston to have a back-and-forth motion inside the inner tube body 240 without being damaged or deformed, including, but not limited to, metal such as iron, cast iron, and aluminum alloy, and hard plastic material such as high-density polyethylene (HDPE), acrylic, and phenolic.

The piston 164 has a shape of a disk, and perpendicular to the surface of the disk, there are one or more piston bypass holes 166 punctured through the disk. In some embodiments, as shown in FIG. 2, there are four piston bypass holes 166. The hollow cylindrical chamber 300 is divided by the piston 164 into upper chamber 302 and lower chamber 304. When the piston 164 moves toward the upper chamber 302, the piston bypass holes 166 allow some of the oil in the upper chamber 302 to flow to the lower chamber 304. The total hollow area created by the piston bypass holes 166 is another controllable factor that can be adjusted at the manufacturing stage in order to control the compression and rebound speeds of the shock absorber 100.

Shock shaft O-ring 202 provides an oil shield against leaks out of the through hole 144 of the outer tube body 140.

Shock shaft bushing 204, upper shock shaft O-ring 206, and lower shock shaft O-ring 212 help keep the piston rod 160 properly aligned along the central axis 500 while also providing bearing for the movement of the piston rod 160. Shock shaft shield 208 and bottom shock cap 210 fix the position of the piston rod 160 with respect to the outer tube body 140. As shown in FIG. 3, in one embodiment the bottom shock cap 210 may be screwed onto the outer tube body 140. Shock dust cap 200 covers the outermost area around and over the shock shaft O-ring 202, shock shaft bushing 204, upper shock shaft O-ring 206, shock shaft shield 208, bottom shock cap 210, and lower shock shaft O-ring 212. Thus, shock dust cap 200 provides protection of the parts against contamination by dust and other debris. The shock dust cap 200 may be made of flexible material such as rubber. More preferably, it may be made of rigid material such as hard plastic or metal in order to provide better shielding against dust and other debris. In addition, suitable materials known to a person having ordinary skill in the art may be used for the shock shaft O-ring 202, shock shaft bushing 204, upper shock shaft O-ring 206, shock shaft shield 208, bottom shock cap 210, and lower shock shaft O-ring 212. Other parts may be added to further stabilize the piston motion along the central axis 500.

Figure 4A:
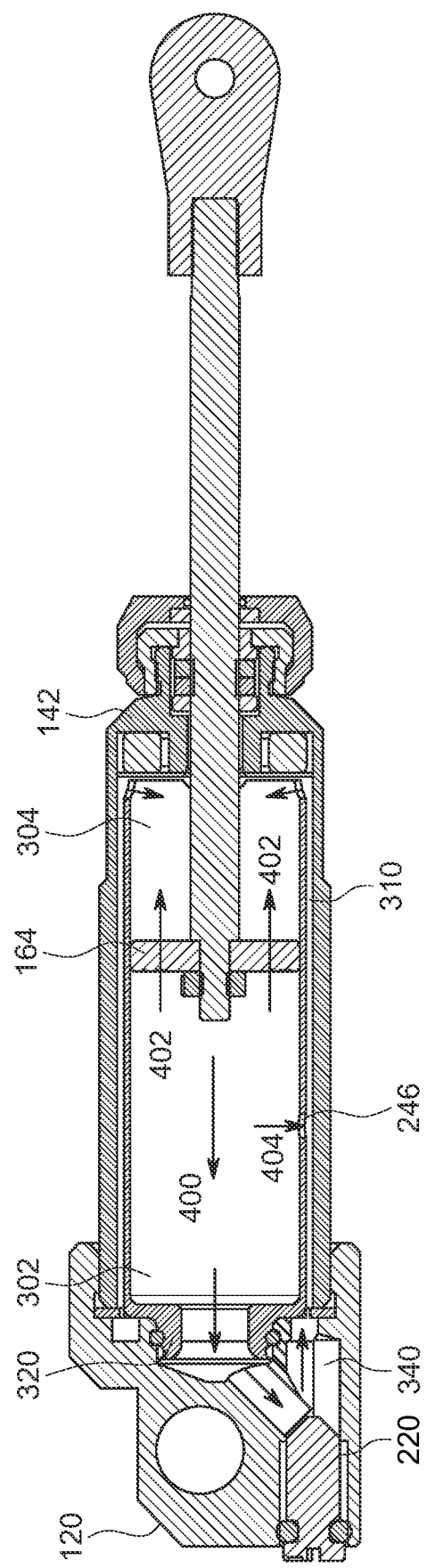
FIG. 4A is a sectional view of the suspension shock absorber of FIG. 1 taken at the sectioning plane and in the direction indicated by section lines 3-3 in its compression stage with a bypass valve in the open position, where the piston has not yet passed the position-sensitive bypass port.

The modes of operation of the shock absorber 100 are illustrated in FIGS. 4A-7. FIGS. 4A-4B depict a sectional view of the suspension shock absorber 100 like FIG. 3, where the shock absorber 100 is in a compression stage with a bypass valve 220 in the open position. When the suspension shock absorber 100 is compressed by an external force, such as from terrain variation, the piston 164 moves away from the bottom floor 142 toward the shock cap 120 as indicated by an arrow 400. The hollow cylindrical chamber 300 is filled with oil. As the piston 164 presses the oil in the upper chamber 302, some of the oil flows through the piston bypass holes 166 (see FIG. 2) to the lower chamber 304 (see arrows 402 through the piston 164 in FIG. 4A for oil flow). This allows the piston to keep moving, while slowing down the compression speed, because the oil flow through the small area of the piston bypass holes 166 is limited.

As shown in FIG. 4A, during the compression, some of the oil also flows from the upper chamber 302 out through the inner tube neck 320 to the shock cap bypass passage 340, and ultimately the oil flows down through the inter-tube bypass route 310. When the piston 164 has not yet passed the position-sensitive bypass port 246, as shown in FIG. 4A, some of the oil in the upper chamber 302 also flows out to the inter-tube bypass route 310 through the position-sensitive bypass port 246, as indicated by an arrow 404. The bypassed oil in the inter-tube bypass route 310 then flows back to the lower chamber 304 through the bottom bypass port 248. The total amount of bypass oil flow out of the upper chamber 302 in the case of FIG. 4A is equal to the sum of the flows through the piston bypass holes 166, the shock cap bypass passage 340, and the position-sensitive bypass port 246.

Figure 4B:
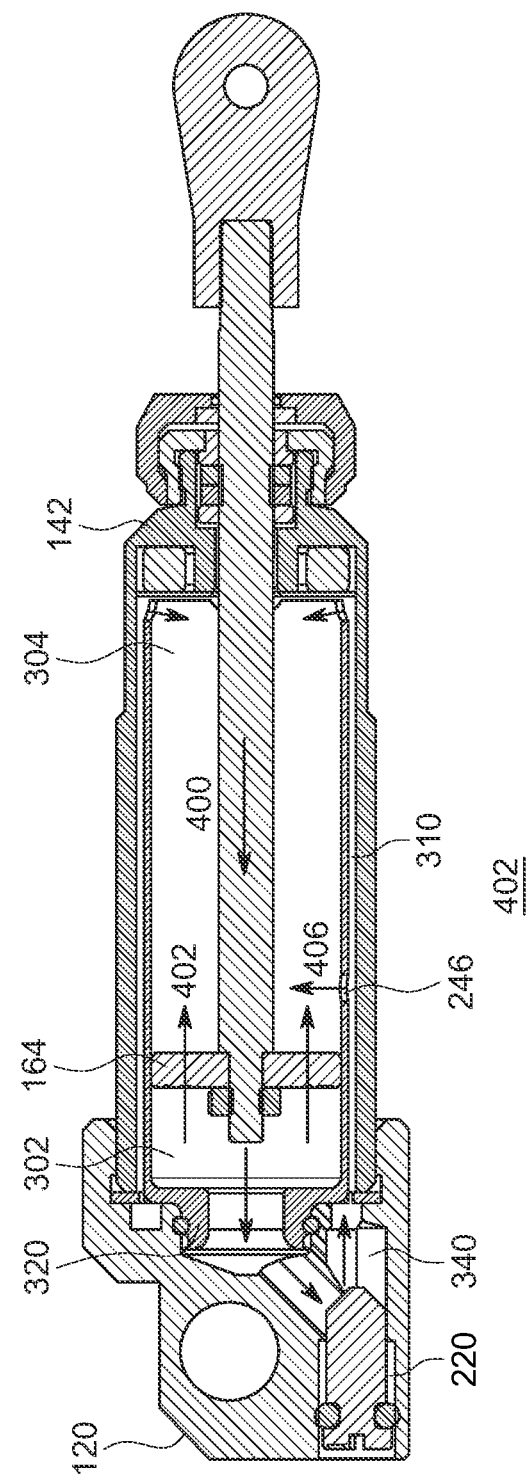
FIG. 4B is the suspension shock absorber of FIG. 4A, where the piston has passed the position-sensitive bypass port.

When the piston 164 moves past the position-sensitive bypass port 246, as shown in FIG. 4B, the oil flow at the position-sensitive bypass port 246 is reversed as indicated by an arrow 406, i.e., the oil flows from the inter-tube bypass route 310 through the position-sensitive bypass port 246 into the lower chamber 304. Because the total amount of bypass oil flow out of the upper chamber 302 is now equal to the flows through the piston bypass holes 166 and the shock cap bypass passage 340 minus the flow through the position-sensitive bypass port 246, the compression of the upper chamber 302 is further slowed down. In other words, the compression by the piston 164 becomes "harder" beyond the position-sensitive bypass port 246.

Figure 5A:
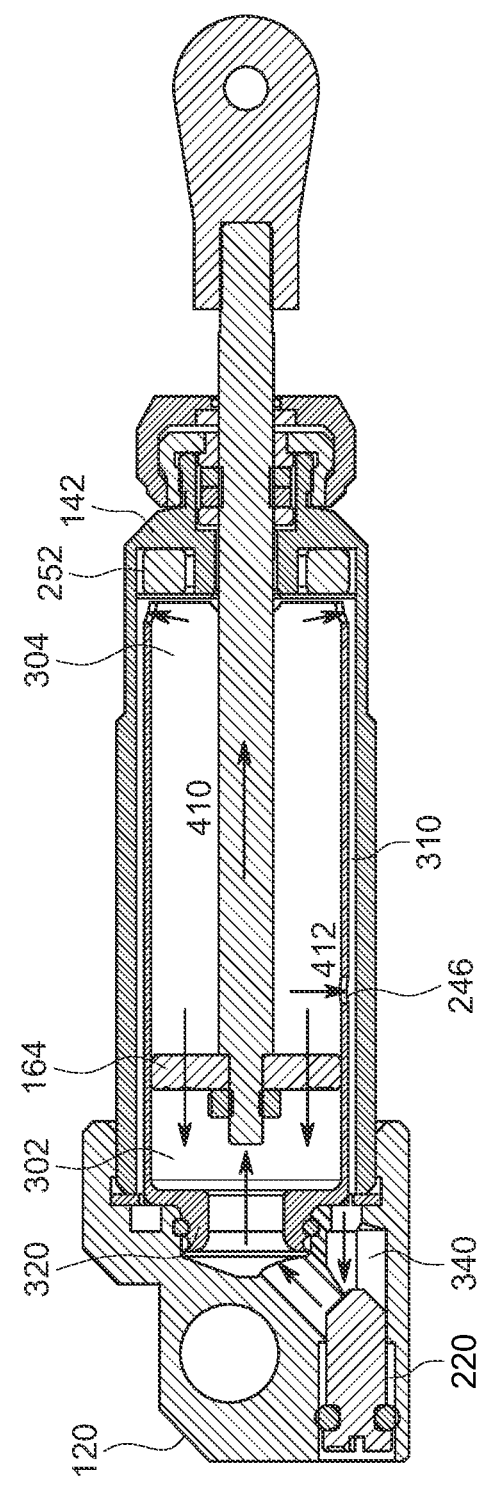
FIG. 5A is a sectional view of the suspension shock absorber of FIG. 1 taken at the sectioning plane and in the direction indicated by section lines 3-3 in its rebound stage with the bypass valve in the open position, where the piston has not yet passed the position-sensitive bypass port.
Figure 5B:
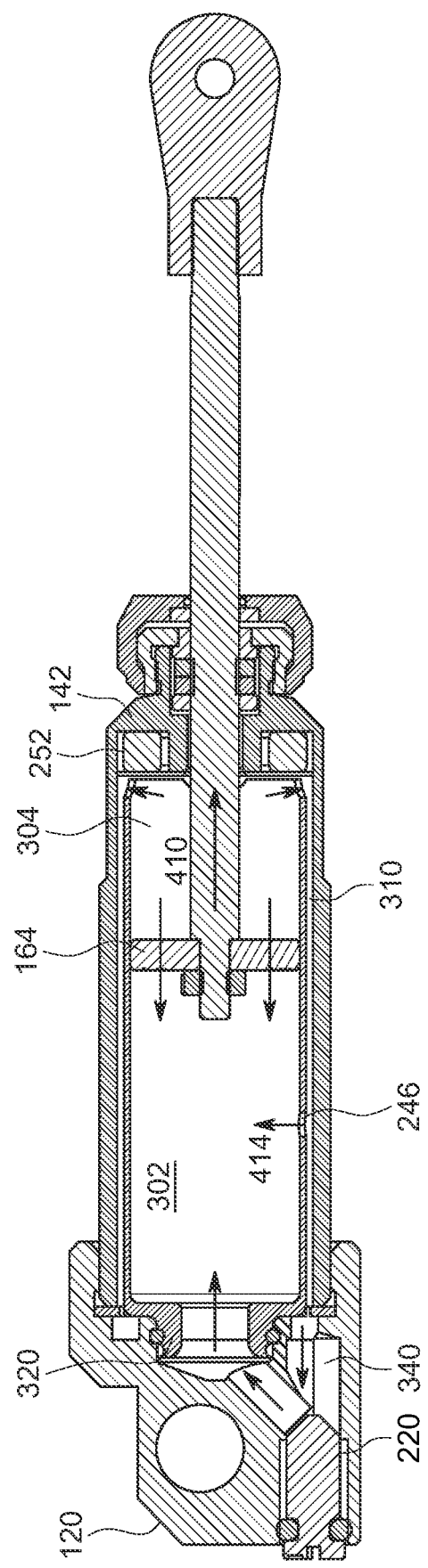
FIG. 5B is the suspension shock absorber of FIG. 5A, where the piston has passed the position-sensitive bypass port.

FIGS. 5A-5B depict a sectional view of the suspension shock absorber 100 like FIG. 3, with the bypass valve 220 in the open position as in the FIGS. 4A-4B but where the shock absorber 100 is in a rebound stage. When the suspension shock absorber 100 rebounds, for example by the recoil force of an external suspension spring (such as external spring 260 shown in FIGS. 1 and 2), the piston 164 moves away from the shock cap 120 toward the bottom floor 142 as indicated by an arrow 410. As the piston 164 presses the oil in the lower chamber 304, some of the oil flows out through the bottom bypass port 248 into the inter-tube bypass route 310. At the same time, as shown in FIG. 5A, when the piston has not yet moved past the position-sensitive bypass port 246, some of the oil also flows out through the position-sensitive bypass port 246 into the inter-tube bypass route 310, as indicated by an arrow 412. Thus, the total amount of bypass oil flow out of the lower chamber 304 in the case of FIG. 5A is equal to the sum of the flows through the piston bypass holes 166, the bottom bypass port 248, and the position-sensitive bypass port 246.

On the other hand, when the piston 164 moves past the position-sensitive bypass port 246, as shown in FIG. 5B, the oil flow at the position-sensitive bypass port 246 is reversed as indicated by an arrow 414, i.e., the oil flows from the inter-tube bypass route 310 through the position-sensitive bypass port 246 into the upper chamber 302. Because the total amount of bypass oil flow out of the lower chamber 304 is now equal to the flows through the piston bypass holes 166 and the bottom bypass port 248 minus the flow through the position-sensitive bypass port 246, the compression of the lower chamber 304 is further slowed down. In other words, the rebound of the piston 164 becomes "faster" beyond the position-sensitive bypass port 246.

In addition, when the piston 164 is in its rebound stage as in FIGS. 5A-5B, the volume spacer 252 is temporarily compressed and shrunk due to the compressed lower chamber 304. This further speeds up the rebound motion to make the rebound "faster." The relatively harder compression and faster rebound shock absorption characteristics are desired in remote control (RC) car racings because of the small scale of RC cars.

In many conventional shock absorbers, a shock-absorbing "bladder" or "reservoir" with an air cushion chamber is located at the upper portion of a chamber such that compression is softened. However, during the fast compression, the lower chamber without a volume spacer may undergo a sudden expansion in volume, and air bubbles may form in the oil. This changes the compression and rebound characteristics over time. Moreover, the volume of air inside the bladder or reservoir changes in temperature, thereby affecting the compression/rebound characteristics. By providing the volume spacer 252 in the lower chamber 304 that expands during the fast compression stage, air bubble formation in oil is suppressed. In addition, by using the volume spacer 252 having a foam structure rather than an air pocket, the compression/rebound characteristics of the shock absorber 100 becomes less influenced by the ambient temperature. Therefore, the compression/rebound characteristics of the shock absorber are better maintained.

Figure 6:
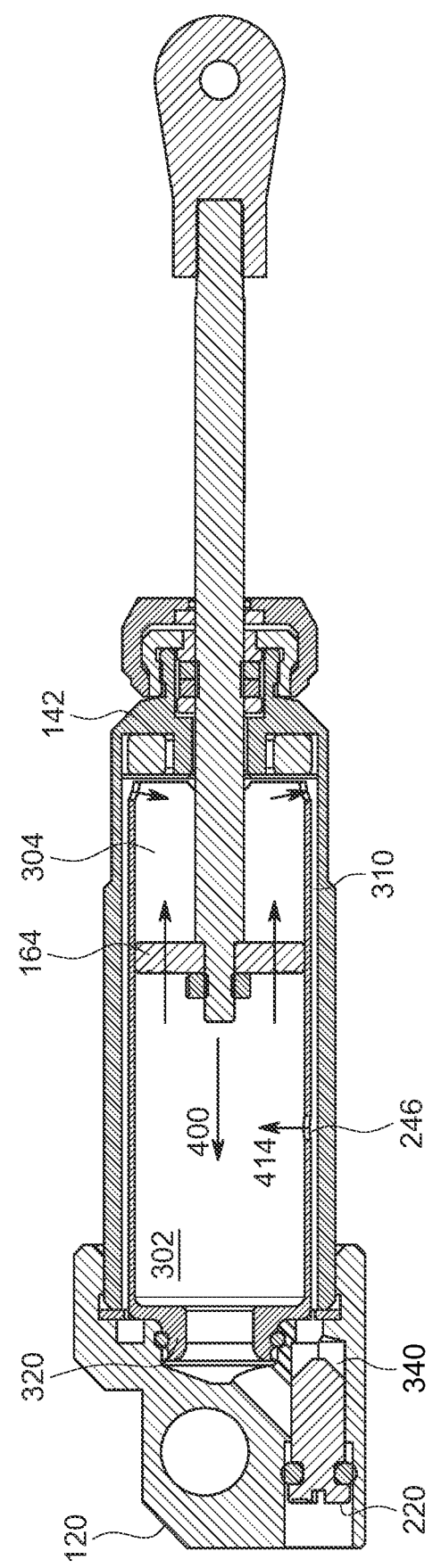
FIG. 6 is a sectional view of the suspension shock absorber of FIG. 1 taken at the sectioning plane and in the direction indicated by section lines 3-3 in its compression stage with the bypass valve in the closed position.

FIG. 6 depicts a sectional view of the suspension shock absorber 100 like FIG. 3, where the shock absorber 100 is in a compression stage with the bypass valve 220 in the closed position. As in FIGS. 4A-4B, the shock absorber 100 is in the same compression stage. However, because the shock cap bypass passage 340 is closed in FIG. 6, the oil flow between the inner tube neck 320 and the inter-tube bypass route 310 is blocked. When the piston 164 moves away from the bottom floor 142 toward the shock cap 120 as indicated by an arrow 400, the bypass oil out of the upper chamber 302 flows only through the piston bypass holes 166 and the position-sensitive bypass port 246. Therefore, compression "hardens" compared to the case of FIGS. 4A-4B where the bypass valve 220 was in the open position. Especially when the piston 164 moves past the position-sensitive bypass port 246, the bypass oil out of the upper chamber 302 only flows through the piston bypass holes 166, which further hardens the compression.

Figure 7:
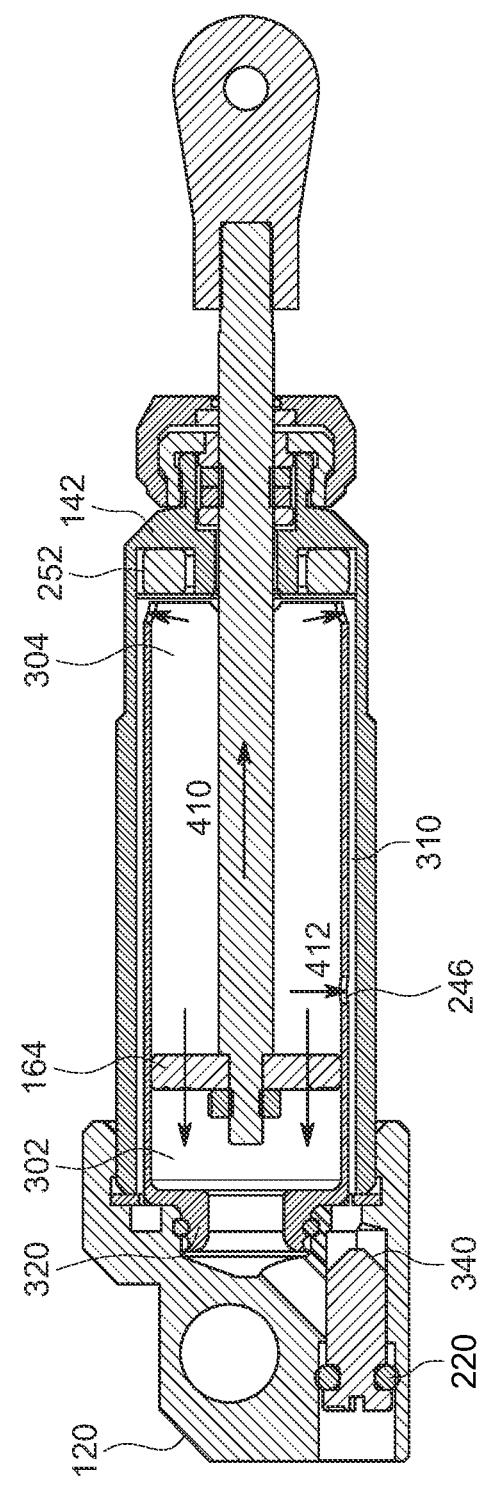
FIG. 7 is a sectional view of the suspension shock absorber of FIG. 1 taken at the sectioning plane and in the direction indicated by section lines 3-3 in its rebound stage with the bypass valve in the closed position.

FIG. 7 depicts a sectional view of the suspension shock absorber 100 like FIG. 3, where the shock absorber 100 is in a rebound stage with the bypass valve 220 in the closed position. As in the case of FIG. 6, because the shock cap bypass passage 340 is closed in FIG. 7, the oil flow between the inner tube neck 320 and the inter-tube bypass route 310 is blocked. By the same mechanism discussed above, rebound "slows" compared to the case of FIGS. 5A-5B where the bypass valve 220 was in the open position.

Although FIGS. 4A-7 show only the cases where the bypass valve 220 is either fully open or fully closed, any point between these two positions may be taken. By adjusting the position of the bypass valve 220 using a screw driver, a user can easily and quickly adjust the compression/rebound speed of the shock absorber 100 without having to change the oil or disassembling the shock absorber 100 from the vehicle.

Because the bypass valve 220 is disposed in about the same direction as that of the movement of the piston 164, or in line with the elongated shape of the suspension shock absorber 100, when two shock absorbers are attached to the wheels on the same axle, the bypass valves of the two shock absorbers are positioned close to each other, thereby a quick adjustment of the two wheels is possible. Moreover, because the bypass valve 220 is offset from the coaxial line of the outer tube body 140 and the inner tube body 240 rather than disposed at the center of the shock cap 120, as shown in FIGS. 1-7, it is possible to install suspension shock absorbers in RC vehicles such that adjusting a bypass valve of one shock absorber is not hindered by the presence of its adjacent shock absorber and/or other structure of the vehicle, while allowing the user to quickly adjust both shock absorbers at the same time. For example, where two shock absorbers are installed on the front wheels of an RC vehicle, their bypass valves may be exposed close to each other. Where two shock absorbers are installed on the rear wheels of the RC vehicle, the shock absorbers may be flipped such that their bypass valves are farther from each other, thus allowing the user unobstructed access to the bypass valves with the presence of a spoiler.

While embodiments have been illustrated and described, as noted above, many changes can be made without departing from the spirit and scope of the SUSPENSION SHOCK ABSORBER. Accordingly, the scope of the SUSPENSION SHOCK ABSORBER is not limited by the disclosure of these preferred and alternate embodiments. Instead, the scope of the invention title is determined entirely by reference to the claims. Insofar as the description above and the accompanying drawings (if any) disclose any additional subject matter that is not within the scope of the claims below, the inventions are not dedicated to the public and Applicant hereby reserves the right to file one or more applications to claim such additional inventions.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent, or similar purpose, unless expressly stated otherwise. Thus, unless expressly stated otherwise, each feature disclosed is one example of a generic series of equivalent or similar features.

Any element in a claim that does not explicitly state "means for" performing a specified function, or "step for" performing a specific function is not to be interpreted as a "means" or "step" clause as specified in 35. U.S.C. § 112 ¶6. In particular, the use of "step of" in the claims herein is not intended to invoke the provisions of U.S.C. § 112 ¶6.

What is claimed is:

1. A suspension shock absorber comprising:
   an inner tube comprising
      a first proximal end,
      a first distal end,
      a hollow space defining an inner chamber, and
      a bottom bypass port near the first distal end;
   an outer tube coaxial with the inner tube along a central axis and comprising a second proximal end and a second distal end;
   an inter-tube bypass route defined by a space between the outer tube and the inner tube;
   a piston rod slidably connected to the second distal end;
   a piston disposed in the inner chamber and defining a lower chamber within the inner chamber between the piston and the first distal end, wherein the lower chamber has a lower chamber volume;
   a volume spacer disposed in the lower chamber and capable of expanding and contracting when the lower chamber volume temporally changes;
   a shock cap connected to the first proximal end and the second proximal end, wherein the shock cap further defines a bypass passage fluidly communicating the inner chamber and the inter-tube bypass route; and
   a bypass valve connected to the shock cap, wherein the bypass valve adjustably regulates the bypass passage.

2. The suspension shock absorber of claim 1, wherein the inner tube further comprises one or more position-sensitive bypass port between the proximal end and the distal end.

3. The suspension shock absorber of claim 1, wherein the piston further comprises one or more piston bypass holes.

4. The suspension shock absorber of claim 1, wherein the volume spacer is elastic.

5. The suspension shock absorber of claim 4, wherein the volume spacer is a foam.

6. The suspension shock absorber of claim 1, further comprising a volume spacer retainer.

7. The suspension shock absorber of claim 1, wherein adjustably regulating the bypass passage by the bypass valve is done with a screw driver.

8. The suspension shock absorber of claim 7, wherein the bypass valve is aligned in parallel to the central axis defined by the inner tube and the outer tube.

9. The suspension shock absorber of claim 8, wherein the bypass valve is offset from the central axis.

10. The suspension shock absorber of claim 1, further comprising a shock cap oil ring disposed between the shock cap and the outer tube.

11. The suspension shock absorber of claim 10, wherein the shock cap oil ring has an inner perimeter, and the inner perimeter has a plurality of grooves and ridges.

12. The suspension shock absorber of claim 1, further comprising a shock shaft bushing.

13. The suspension shock absorber of claim 1, further comprising a shock dust cap.

14. The suspension shock absorber of claim 13, wherein the shock dust cap is rigid.

15. The suspension shock absorber of claim 1, further comprising a rebound spring disposed outside of the outer tube and along the central axis.

* * * * *